J. P. LEGGETT.
VEHICLE PROPELLING MECHANISM.
APPLICATION FILED MAY 29, 1911.

1,093,277.

Patented Apr. 14, 1914.
3 SHEETS—SHEET 2.

WITNESSES:
R. L. Hamilton
E. B. House

INVENTOR.
Joseph P. Leggett
By Warren D. House
His ATTORNEY.

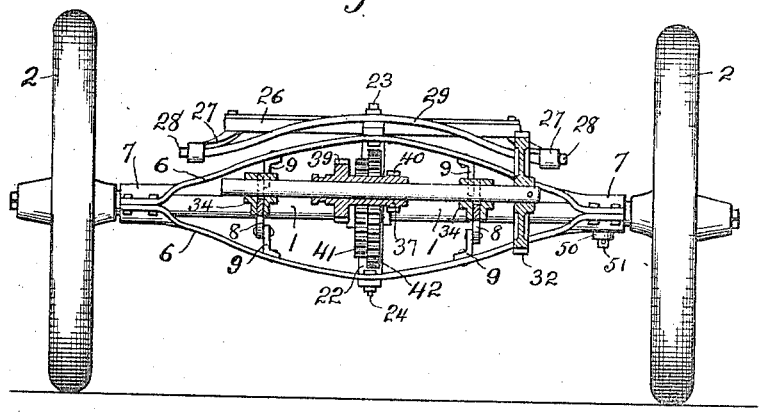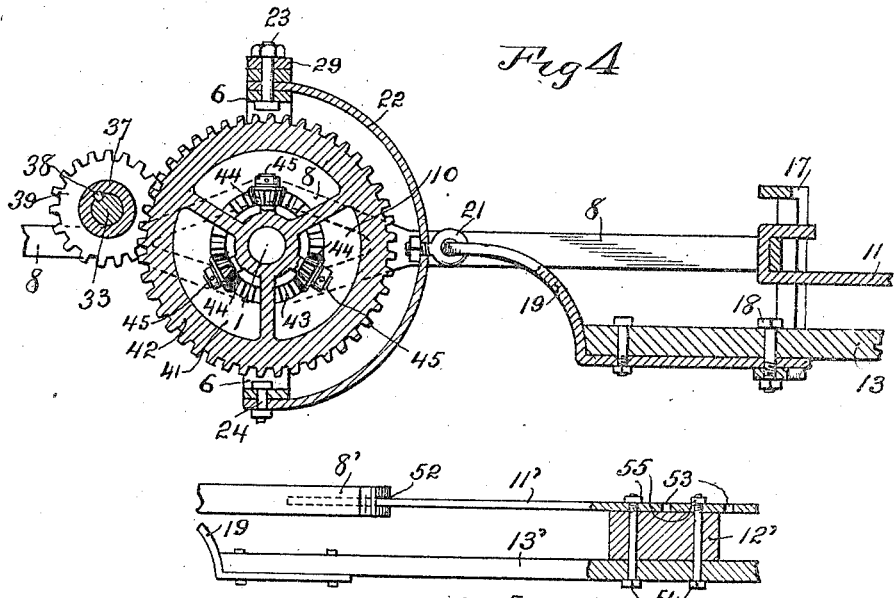

UNITED STATES PATENT OFFICE.

JOSEPH P. LEGGETT, OF CARTHAGE, MISSOURI.

VEHICLE PROPELLING MECHANISM.

1,093,277.   Specification of Letters Patent.   Patented Apr. 14, 1914.

Application filed May 29, 1911.   Serial No. 630,136.

*To all whom it may concern:*

Be it known that I, JOSEPH P. LEGGETT, a citizen of the United States, residing at Carthage, in the county of Jasper and State of Missouri, have invented certain new and useful Improvements in Vehicle Propelling Mechanisms, of which the following is a specification.

My invention relates to improvements in vehicle propelling mechanisms. It is particularly adapted for use in automobile construction.

One object of my invention, is to provide a structure in which the weight of the motor, employed to propel the vehicle, is used to assist the driving wheels in climbing over an obstruction or to hold the wheels back when they enter a depression in the road.

Another object of my invention is to provide a structure in which the motor and driving mechanism are located so as to be easily accessible for inspection or repairs.

A further object of my invention is to provide a structure in which the driving wheels will have a maximum of traction power.

Still another object of my invention is to provide a structure in which the driving mechanism is wholly supported by the running gearing, thereby enabling the body and springs of the vehicle to be more lightly constructed than can be the case where the body supports part of the weight of the driving mechanism.

A further object of my invention is to provide a structure which is not liable to skid, and which when skidding is easily steered.

A further object of my invention is to provide a simple, strong and efficient mechanism, which is cheap to manufacture, not liable to get out of order, and which may be easily operated and repaired.

The novel features of my invention are hereinafter fully described and claimed.

Figure 1:
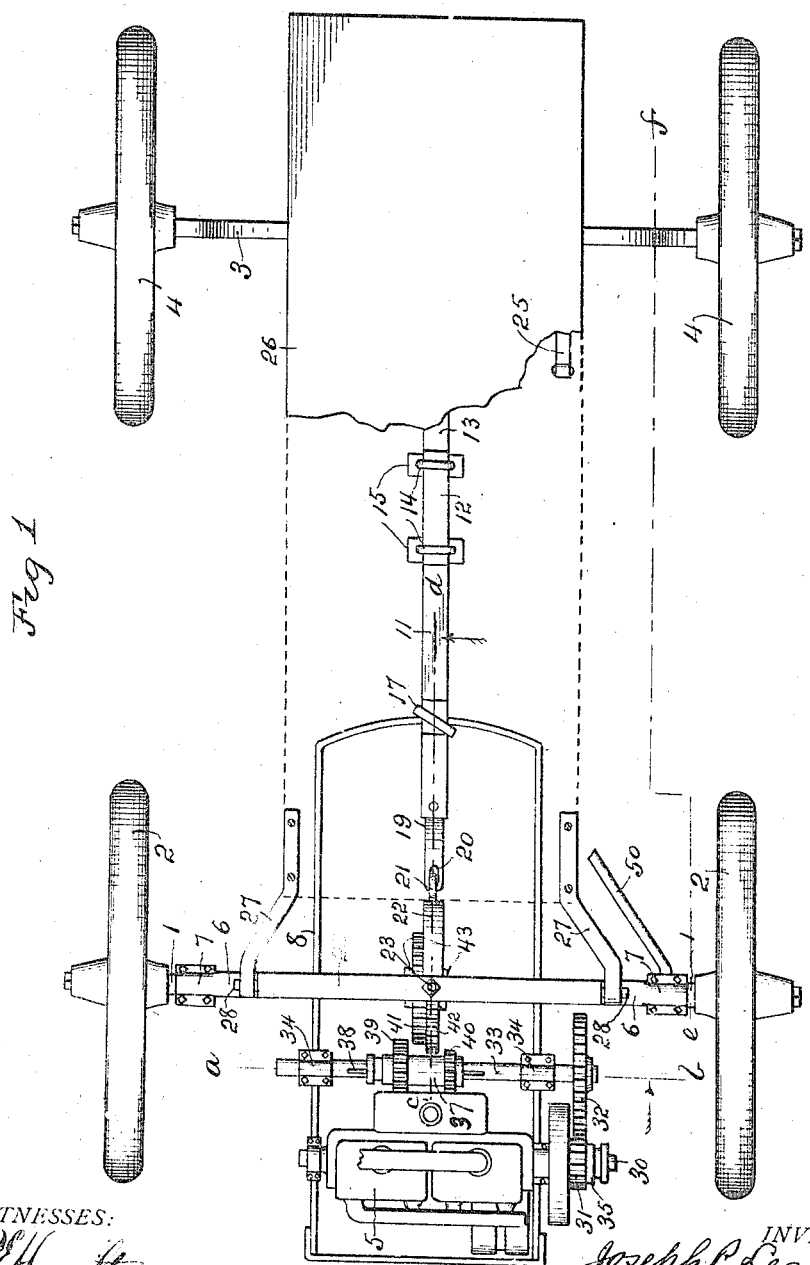
Figure 2:
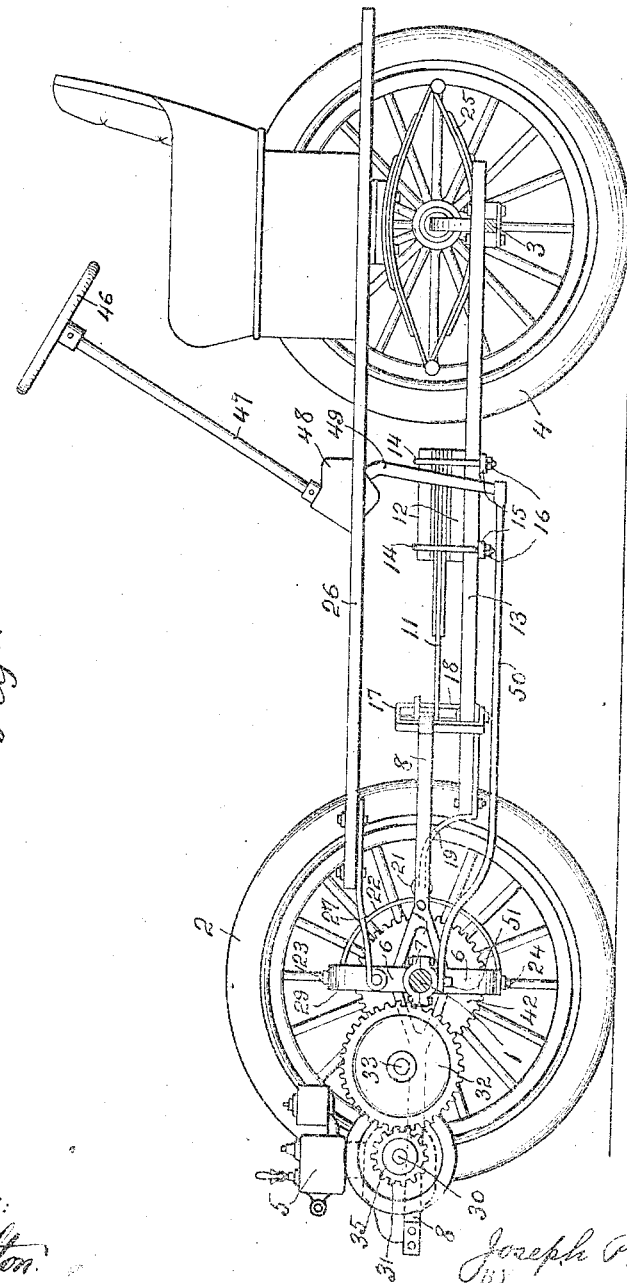

In the accompanying drawings which illustrate one form of my invention as applied to an automobile having for a motor an ordinary explosive engine, Figure 1 is a plan view of the vehicle, parts being removed and parts being broken away. Fig. 2 is a vertical section on the line *e—f* of Fig. 1. Fig. 3 is a vertical section on the line *a—b* of Fig. 1. Fig. 4 is a vertical section on the line *c—d* of Fig. 1. Fig. 5 is a view partly in side elevation and partly in vertical section of a modified form of spring mechanism for controlling the movement of the swinging frame.

Similar reference characters designate similar parts.

1 designates the front axle which, preferably, is the driving axle and which, preferably, consists of two rotary members disposed in alinement with each other and having their inner ends adjacent to each other, their outer ends having secured to them respectively the front driving wheels 2.

3 designates the rear axle on which are rotatively mounted the rear carrying wheels 4.

The motor for driving the machine may be of any desired kind such as steam, electric, or explosive. The motor is supported so as to move vertically with respect to the driving axle, and driving gearing is provided which connects the motor with the running gearing so as to drive the driving wheels and to enable the vertical movement of the motor to exert a prying effect upon the driving wheels to enable said wheels to more readily surmount obstructions.

In the drawings I have illustrated a motor of the ordinary hydrocarbon explosive type. The motor, which is designated by 5, is preferably disposed forward of the front axle 1. The motor is supported upon a frame for which the axle 1 serves as a horizontal pivotal support. This frame comprises, preferably, a vertical portion consisting of two bow-shaped bars 6, disposed respectively above and below the axle 1 and having their opposite ends secured to each other and forming boxes 7, in which the two members 1 of the axle are respectively rotatively mounted. A horizontal, rectangular portion 8, of the frame, extends forwardly and rearwardly between the bow-shaped members 6, to which members it is rigidly secured by brackets 9, as is shown in Fig. 3. As shown in Figs. 2 and 4, opposite sides of the horizontal portion 8 of the frame are provided with holes 10, through which the axle members 1 respectively extend.

The engine 5 is supported upon and rigidly secured to the frame portion 8, forward of the axle 1. To counterbalance the weight of the engine 5, the frame portion 8 has connected to it at the rear of the axle 1, yielding means by which the vertical swinging movement of the frame is resisted. Preferably, this yielding means comprises a flat, horizontal, leaf spring 11, the rear end of which is mounted between blocks 12, which are rigidly clamped to the upper side of a reach 13, which is secured and supported to the rear axle 3. The blocks 12 are preferably clamped to the reach 13 by means of two inverted U-shaped bolts 14, which embrace the blocks 12 and opposite sides of the reach 13, and which have their lower screw-threaded ends extending respectively through horizontal clamping plates 15, disposed at the underside of the reach 13 and clamped thereto by means of nuts 16, shown in Fig. 2, which are mounted upon the threaded ends of the U bolts 14. The forward end of the spring 11, which is U-shaped, embraces the upper and lower edge of the rear part of the frame portion 8, as best seen in Figs. 2 and 4. By thus engaging the frame portion 8 the spring 11 resists vertical movement of said frame portion, either upwardly or downwardly, but permits lateral movement of said frame portion when the axle 1 is swung laterally in steering.

To limit the upward movement of the spring 11, I provide a rectangular, vertical link 17, through which the rear part of the frame portion 8, the forward end of the spring 11, and the reach 13, extend, the link being rigidly secured at its lower end to the reach 13, by a vertical bolt 18, as shown in Figs. 2 and 4. The forward end of the reach 13 has secured to it a bar 19, the forward end of which is provided with a vertical hole 20, in which is loosely and pivotally mounted the eye of a horizontal eye bolt 21, the forwardly extending shank of which is secured to the center of a vertically disposed semi-circular bar 22, the upper and lower ends of which are respectively pivotally secured to the upper and lower members 6 of the frame, by vertical bolts 23 and 24, as is best shown in Fig. 4. By means of this construction the frame which supports the motor 5 is capable of a limited amount of pivotal movement on the axle 1, which pivotal movement is resisted by the spring 11. This construction also permits the free lateral swinging of the front axle and the motor supporting frame relative to the reach 13 and spring 11.

Supported on the rear axle 3 are suitable springs 25, upon which is supported the rear end of the body 26 of the vehicle, the forward end of which has rigidly secured to it two forwardly and downwardly extending plates 27, which are preferably resilient, and have their forward ends pivotally engaging the horizontal ends 28 respectively of a bow-shaped bar 29, disposed transversely to the body 26, and having a central vertical hole through which extends the bolt 23, the bar 29 being disposed above the upper member 6 of the frame.

Suitable driving mechanism connects the motor 5 with the axle members 1. Any desired type of driving mechanism can be employed, and in the drawings, I have illustrated an ordinary differential gearing which connects the motor 5 with the front axle members 1.

The motor driving shaft, which is denoted by 30, has mounted on it a pinion 31, which meshes with a spur gear 32, which is rigidly secured on a horizontal shaft 33, which is disposed parallel with the axle members 1 and is rotatively mounted in boxes 34, which are secured upon opposite sides of the frame portion 8. A clutch 35, of any ordinary type, is mounted on the shaft 30 and is provided with means for releasably locking the pinion 31 to the driving shaft 30, said locking means being of any ordinary type, and not shown. Suitable mechanism, not shown, may be employed for operating the clutch 35. Longitudinally slidable on the shaft 33, is a sleeve 37, which is held from rotating around the shaft 33 by a feather 38. The sleeve 37 is provided with two sets of pinion teeth 39 and 40, which are adapted to respectively engage with two spur gear wheels 41 and 42 which are rigidly and concentrically secured together, the gear wheel 42 having a hub, in which the inner ends of the axle members 1 are rotatively mounted. Said axle members 1 have respectively rigidly secured to them two bevel gear wheels 43. Between the bevel gear wheels 43 and meshing therewith, are one or more bevel pinions 44, which are respectively rotatively mounted on radial studs 45 with which the hub of the wheel 42 is provided, as shown in Fig. 4.

Any suitable mechanism, not shown, may be provided for shifting the sleeve 37 on the shaft 33, to positions in which the two sets of pinion teeth 39 and 40 may be made to respectively engage the gear wheels 41 and 42, for the purpose of changing the speed of rotation of the driving axle, the diameters of the gears 39 and 42 being greater than those of the gears 40 and 41.

For steering the front axle, any ordinary steering mechanism may be provided. In Fig. 2 of the drawing, I have shown an ordinary steering mechanism adapted for this purpose. This mechanism is provided with a steering wheel 46, mounted on a shaft 47, which is rotatively mounted in a housing 48 and provided with means, not shown, for swinging forwardly and backwardly a lever 49, the lower end of which is pivotally connected to the rear end of a horizontal rod 50, the forward end of which is loosely and pivotally connected to a downwardly extending stud 51, which is provided on one of the boxes 7. By turning the steering wheel 46 in opposite directions, the front axle 1 may be swung laterally by means of the mechanism just described.

In operating my invention, the clutch 35 is operated in the usual manner to lock the pinion 31 to the driving shaft 30, the motor 5 being in operation. The sleeve 37 is then moved to engage the pinion teeth 39 with the gear 41, or to engage the pinion teeth 40 with the gear 42 according to whether it is desired to drive the axle 1 at high or low speed.

If either one of the driving wheels 2 encounters an obstacle, such wheel will suddenly be lifted, while the motor 5, being of considerable weight and pivotally supported on the axle 1, will, by reason of its inertia, tend to remain in the same horizontal plane in which it is moving. This will cause the motor, through the gearing which connects its driving shaft 30 with the axle members 1, to exert a prying effect which will tend to turn the driving wheels 2 in the forward direction in which they are at the time moving.

If one of the forward driving wheels 2 should start to drop into a depression in the road, the opposite effect of the weight of the motor upon the driving wheels from that which has just been described, will be produced. The engine, by its weight, and by reason of its pivotal connection with the driving axle, will tend to remain in the horizontal plane in which it is moving, and will, through the gearing which connects its driving shaft with the axle members 1, exert a prying action tending to hold the driving wheels 2 from rotating in the direction in which they are rotating at the time.

By locating the motor 5 forward of the driving axle and connecting the spring 11 to the frame which supports the motor, at a point to the rear of the driving axle, a much greater traction effect upon the driving wheels can be obtained than in a construction in which the motor is located between the front and rear axles. In the latter case, the rear axle carries a part of the weight of the motor, while in the other case the entire weight of the motor is upon the front axle, and at the same time the spring 11 tends to exert a downward pressure upon the front axle.

By employing the front axle as the driving axle the greater part of the danger of skidding is eliminated, as in case the wheels do start to skid the operator may readily steer the front driving wheels in the direction in which they should go, and the rear wheels will follow. Another advantage of employing the front wheels as driving wheels is increased power, due to the fact that a vehicle is easier pulled over a rough or heavy road than pushed.

By supporting the motor and motor frame upon the front axle, which, as shown is pivoted on a vertical axis so as to swing laterally, a very easy steering mechanism is provided, and there is not any tendency for the axle swinging accidentally due to either of its wheels striking an uneven place in the road, the inertia of the heavy motor serving to hold it from sudden pivotal swinging. Thus the mounting of the motor, as described, serves the double function of assisting the raising of the forward wheels over obstructions and for preventing sudden pivotally swinging of the axle when the wheels strike uneven places.

By supporting the motor wholly upon the running gear, instead of supporting a part of its weight from the body of the vehicle, said body and the springs which support it may be made much lighter than would be the case if a portion of the weight of the motor were suspended from the body of the vehicle.

In case that it is desired to vary the tension of the spring 11, the nuts 16, on the U bolts 14, may be loosened and the blocks 12 adjusted forward or backward upon the reach 13, to a position in which the spring 11 will have the proper tension, after which the nuts 16 are again tightened.

In Fig. 5 I have illustrated a modified form of spring mechanism for controlling the swinging of the frame which supports the motor. 8' designates a frame portion corresponding to the frame portion 8 heretofore described, with the exception that the rear end of the frame portion 8' is provided with a horizontal slot 52, through which extends the forward end of a horizontal flat spring 11', which corresponds in function to the spring 11, already described, the rear end of the spring 11' being provided with a longitudinal row of holes 53, which are adapted to receive vertical bolts 54, which extend through vertical holes provided in a block 12', mounted on the upper side of a reach 13', having vertical holes in which are mounted the bolts 54. The screw threaded upper ends of the bolts 54 are provided with nuts 55, which rest upon the top of the spring 11' and clamp the spring in the position to which it may be adjusted. By moving the spring 11' forward or backward and changing the bolts 54 to different ones of the holes 53, the tension of the spring 11' may be changed. The operation of this form of spring mechanism is precisely the same as in the other form of spring mechanism, already described.

I do not limit my invention to the structures shown and described, as many modifications, within the scope of the appended claims, may be made without departing from the spirit of my invention.

Having thus described my invention, what I claim and desire to secure by Letters Patent, is:—

1. In a vehicle propelling mechanism, running gearing having a vertically pivoted front axle, a rear axle, a driving wheel on the front axle, and a reach connected to the rear axle, a frame supported by the front axle and movable vertically relatively thereto, a motor carried by the frame forward of the front axle, driving means connecting the motor and running gearing by which the driving wheel is driven and by which the motor may exert a prying effect upon the driving wheel which respectively assists and resists forward turning of the driving wheel when said wheel moves upwardly and downwardly relatively to the motor, and yielding means connecting the reach and frame for resisting the said movement of the frame.

2. In a vehicle propelling mechanism, running gearing having a vertically pivoted front axle, a rear axle, a front driving wheel on the front axle, and a reach connected to the rear axle, a frame pivoted on the front axle to swing vertically, a motor carried by the frame forward of the front axle, driving means connecting the motor and running gearing by which the said driving wheel is driven and by which the motor may exert a prying effect upon the said driving wheel which respectively assists and resists forward turning of the driving wheel when said wheel moves upwardly and downwardly relatively to the motor, and means yieldingly connecting the reach and said frame for resisting the swinging vertically of said frame.

3. In a vehicle propelling mechanism, a running gearing having a vertically pivoted front axle, a rear axle, a driving wheel, and a reach secured to the rear axle, a frame pivoted to the front axle and pivoted to the reach so as to swing vertically and horizontally relatively thereto, a spring connecting the reach and frame for resisting vertical movement of the frame in either direction, a motor carried by the frame, and driving means connecting the motor and running gearing by which the driving wheel is driven and by which the motor may exert a prying effect upon the driving wheel when the frame swings vertically.

4. In a vehicle propelling mechanism, running gearing having a vertically pivoted front axle, a rear axle, a driving wheel on the front axle, and a reach secured to the rear axle, a frame pivoted to the front axle to swing vertically and pivoted to the reach to swing vertically and horizontally relatively thereto, a spring connecting the reach and frame for resisting movement vertically in either direction of said frame, a motor carried by the frame forward of the front axle, and driving means connecting the motor and running gearing by which the driving wheel is driven and by which the motor may exert a prying effect upon the driving wheel when the frame is swung vertically.

5. In a vehicle propelling mechanism, running gearing having a vertically pivoted axle, a driving wheel on the axle, and a reach, a frame mounted on the axle and vertically movable relatively thereto, yielding means connected to the frame at one side of the axle and to the reach for resisting vertical movement of the frame, a motor mounted on the frame at the other side of the axle, and driving means connecting the motor and running gearing by which the driving wheel is driven and by which the motor may exert a prying effect on the driving wheel which respectively assists and resists forward turning of the driving wheel when said wheel moves upwardly and downwardly relatively to the motor.

6. In a vehicle propelling mechanism, running gearing having a vertically pivoted axle, a driving wheel on the axle, and a reach, a frame mounted on the axle and for which the axle serves as a pivot upon which the frame may swing vertically, yielding means connected to the reach and connected to the frame at one side of the axle for resisting vertical swinging of the frame, a motor carried by the frame at the other side of the axle, and driving means connecting the motor and running gearing by which the driving wheel is driven and by which the motor may exert a prying effect upon the driving wheel which respectively assists and resists forward turning of the driving wheel when said wheel moves upwardly and downwardly relatively to the motor.

7. In a vehicle propelling mechanism, running gearing having a vertically pivoted axle, a driving wheel on the axle, and a reach, a frame mounted on the axle pivotally so as to swing vertically, a spring connecting the reach and frame at one side of the axle for resisting vertical swinging of the frame in either direction, a motor carried by the frame at the other side of the axle, and driving means connecting the motor and running gearing by which the driving wheel is driven and by which the motor may exert a prying effect upon the driving wheel which respectively assists and resists forward turning of the driving wheel when said wheel moves upwardly and downwardly relatively to the motor.

In testimony whereof I have signed my name to this specification in presence of two subscribing witnesses.

JOSEPH P. LEGGETT.

Witnesses:
   WALTER W. HUBBARD,
   B. C. FLOWERS.